US011283607B2

(12) United States Patent
Cristina et al.

(10) Patent No.: US 11,283,607 B2
(45) Date of Patent: Mar. 22, 2022

(54) DYNAMIC DATA ENCRYPTION

(71) Applicant: BRITISH TELECOMMUNICATIONS PUBLIC LIMITED COMPANY, London (GB)

(72) Inventors: Claudia Cristina, London (GB); Fadi El-Moussa, London (GB); Simon Beddus, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 0 days.

(21) Appl. No.: 17/261,065

(22) PCT Filed: Apr. 25, 2019

(86) PCT No.: PCT/EP2019/060655
§ 371 (c)(1),
(2) Date: Jan. 18, 2021

(87) PCT Pub. No.: WO2020/015877
PCT Pub. Date: Jan. 23, 2020

(65) Prior Publication Data
US 2021/0258151 A1 Aug. 19, 2021

(30) Foreign Application Priority Data
Jul. 19, 2018 (EP) .................................... 18184418

(51) Int. Cl.
*H04L 29/06* (2006.01)
*H04L 9/08* (2006.01)
(Continued)

(52) U.S. Cl.
CPC ............ *H04L 9/088* (2013.01); *H04L 9/0631* (2013.01); *H04L 9/30* (2013.01); *H04L 63/30* (2013.01)

(58) Field of Classification Search
CPC . H04L 9/088; H04L 9/063; H04L 9/30; H04L 63/20
See application file for complete search history.

(56) References Cited

U.S. PATENT DOCUMENTS 7,839,999 B2 11/2010 Suzuki et al.
9,720,849 B2 8/2017 Amarendran et al.
(Continued)

FOREIGN PATENT DOCUMENTS

JP 2000-278260 10/2000
JP 2006-191207 7/2006
(Continued)

OTHER PUBLICATIONS

International Search Report for PCT/EP2019/060655 dated Jul. 17, 2019, 4 pages.
(Continued)

*Primary Examiner* — Dao Q Ho
(74) *Attorney, Agent, or Firm* — Nixon & Vanderhye P.C.

(57) ABSTRACT

Actuators and sensors in an intelligent system are controlled by setting encryption types and key lengths to individual applications based on the type of device and application being run. A server system (1) running in a communications gateway, selects an encryption policy for one or more devices under its control. This selection is controlled by an analysis function (11) using data relating to the type of device (13), and the applications to be run on the device (14), to generate an appropriate encryption policy (12) which can be deployed to the device (37). Controlling the analysis and deployment in a gateway device allows co-ordination between devices, and reduces processor time in the devices. An agent is sent to the device alongside the encryption policy data, to control the device according to the encryption policy. In response to events detected and analyzed by analysis function (10), the server sends triggers (Continued)

(45) to the agent loaded on the device to modify its encryption type in accordance with the policy previously deployed. Revisions and updates to the deployed policies can also be initiated, in response to dynamic factors such as resource usage (CPU, bandwidth, battery etc.), data sensitivity, external events and notifications of vulnerabilities to device type and applications used, in order to allocate resources more efficiently. Different encryption systems can be applied to different applications or data streams running on the same device, and encryption can be applied actively as and when required, using dynamic analysis of both the device and the application to encrypt data—for example to only encrypt if malware is detected.

20 Claims, 5 Drawing Sheets

(51) Int. Cl.
*H04L 9/06* (2006.01)
*H04L 9/30* (2006.01)

(56) References Cited

U.S. PATENT DOCUMENTS

| | | | |
|---|---|---|---|
| 11,171,959 B2* | 11/2021 | Wu | G06F 16/93 |
| 2005/0149728 A1 | 7/2005 | Saffre | |
| 2011/0164752 A1 | 7/2011 | Wainner et al. | |
| 2015/0358356 A1* | 12/2015 | Diaz-Tellez | G06F 21/6218 726/1 |
| 2015/0379277 A1 | 12/2015 | Thota et al. | |
| 2016/0306984 A1* | 10/2016 | Amarendran | G06N 5/02 |
| 2017/0111328 A1 | 4/2017 | Leon | |
| 2017/0272472 A1* | 9/2017 | Adhar | G06F 21/316 |
| 2017/0359370 A1 | 12/2017 | Humphries et al. | |
| 2018/0191738 A1* | 7/2018 | David | G06F 21/55 |
| 2021/0258151 A1* | 8/2021 | Cristina | H04L 9/088 |

FOREIGN PATENT DOCUMENTS

| | | |
|---|---|---|
| JP | 2007-081521 | 3/2007 |
| JP | 2014-045237 | 3/2014 |
| KR | 10-1686015 | 12/2016 |
| WO | 2011/008902 | 1/2011 |
| WO | 2014/062395 | 4/2014 |
| WO | 2016/074694 | 5/2016 |

OTHER PUBLICATIONS

Written Opinion of the ISA for PCT/EP2019/060655 dated Jul. 17, 2019, 6 pages.
Written Opinion of the IPEA for PCT/EP2019/060655 dated Jun. 15, 2020, 5 pages.
International Preliminary Report on Patentability for PCT/EP2019/060655 dated Oct. 9, 2020, 12 pages.
Extended EP Search Report for EP18184418.4 dated Jan. 24, 2019, 8 pages.
Combined Search and Examination Report for GB1811783.8 dated Dec. 17, 2018, 6 pages.
R. Masram et al., "Dynamic Selection of Symmetric Key Cyrptographic Algorithms for Securing Data-Based on Various Parameters", Dept. of Computer Engineering and Information Technology, COEP, India, 8 pages.
P. Ganesh et al., "Selective Encryption Algorithm for Wireless Ad-hoc Networks", International Journal on Advanced Computer Theory and Engineering, ISSN (Print: 2319-2526, vol. 1, issue 1, 2012, pp. 35-38.

* cited by examiner

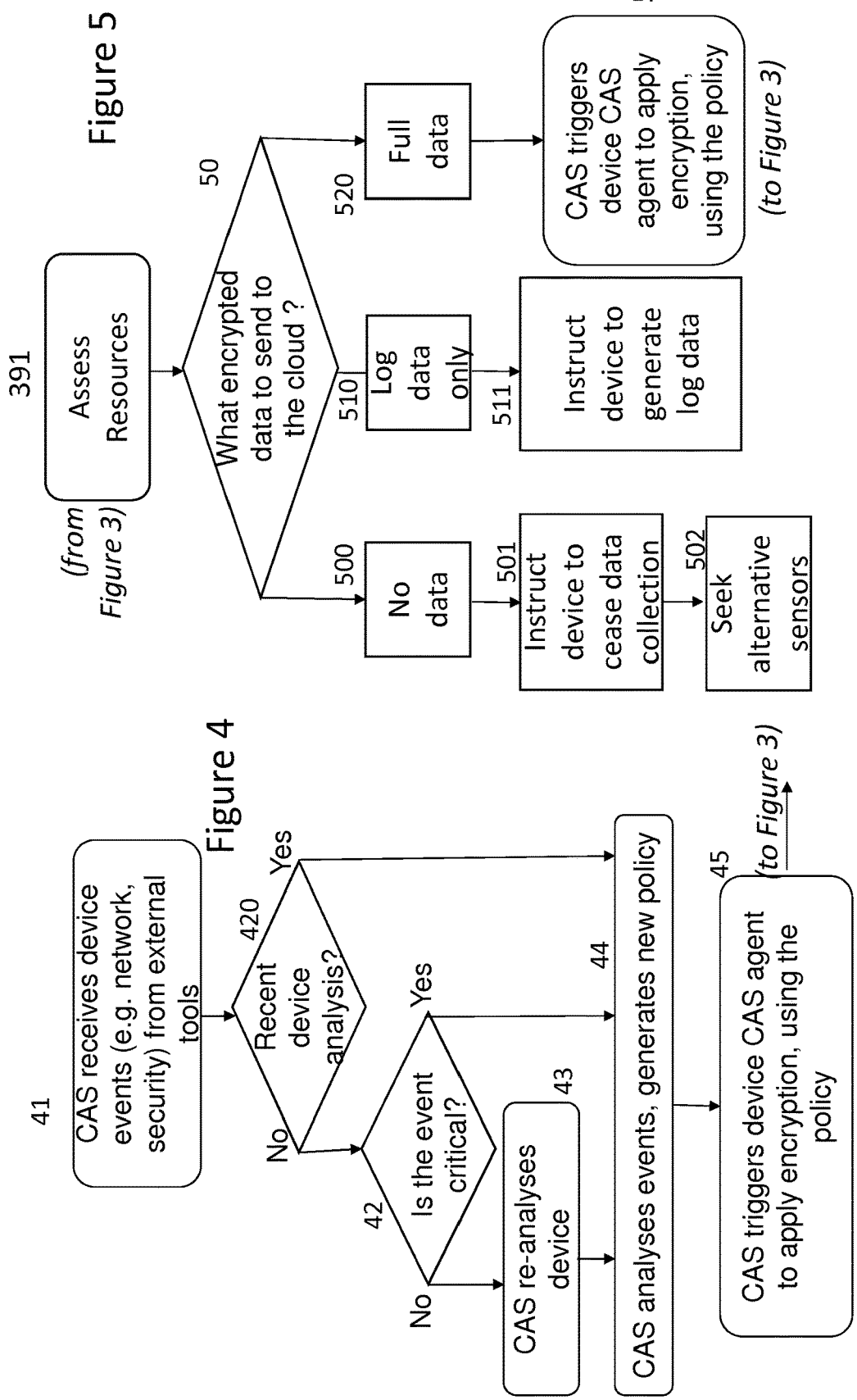

DYNAMIC DATA ENCRYPTION

This application is the U.S. national phase of International Application No. PCT/EP2019/060655 filed Apr. 25, 2019 which designated the U.S. and claims priority to EP Patent Application No. 18184418.4 filed Jul. 19, 2018, the entire contents of each of which are hereby incorporated by reference.

BACKGROUND AND SUMMARY

This invention relates to deployment of intercommunicating sensors and actuators in intelligent systems, commonly known as the "Internet of Things" (IoT).

The requirement for wanting to improve and understand more of the world around us has rapidly led to the development of small devices, such as Raspberry PIs, smartphones, sensors and small format PCs which are able to connect to a communications network in order to provide users, and other devices, with more information about the world around us. The data being generated by sensors typically get sent to distributed storage (often known as the "Cloud") where it can be accessed for use by other applications.

The internet has evolved from its original purpose of simple communication of information between people to include new concepts such as e-commerce, social media and video streaming, in which one or more of the end users of a communications link are automated devices. The Internet of Things takes the internet concept to another level by giving the same connectivity to smaller devices like sensors (e.g. temperature, air quality, accelerometer sensors). The ability to put a sensor on anything means we can get more information about our surroundings.

Examples of properties detected by IoT sensors include detection of people, traffic monitoring, and monitoring air quality. Such measurements can be used to control applications such as turning on street lights based on movement, heating and cooling of buildings, traffic control (e.g phasing of traffic lights)

The IoT data needs to be processed by applications that will make sense of it, and act upon the data, for example turning on lights when movement is detected. Typically IoT sensors are very simple and have limited power to be able to send data via an IP network to the cloud. IoT sensor data is sent to the cloud for storing or to be used by IoT analytical applications. Typically the sensors transmit their data to a nearby gateway (small computer) that has more computing, battery and network power which is then responsible for transforming the data to be sent to the cloud.

As more IoT sensors are being used, more data is getting sent over the network to be analysed. If there is a security-critical IoT application which relies on data to make decisions any latency can be critical. A solution to fix latency problems for critical IoT apps is edge computing.

Edge computing effectively moves the "Cloud" closer to the IoT sensor, by providing a gateway with more computing power (referred to as edge gateway) which sits geographically closer or directly connected to sensors and is able to provide short-term storage for the IoT data. It can also run lightweight IoT applications which can extract only the important data and forward that to the cloud e.g. using a CCTV video stream to do automatic number plate recognition—the edge device can run an application which ingests the video stream, analyses it to recognise characters on vehicle number plates and compare them with a "watch list", and sends to the cloud a screen grab of only those vehicles identified as being on the watch list, rather than the whole video stream.

A gateway can store data from different IoT sensors as well as run different IoT apps, with different owners. IoT data can be sensitive so it is important to ensure the data is secure when travelling over the network.

With increasing numbers of devices under the control of (or at least installed by) increasing numbers of people, ensuring that data is secure is becoming a significant challenge. This has two aspects: firstly, whether the data collected by one user could be misused by another, and secondly whether one user can rely on the data collected by another.

One way to ensure IoT data is secure is by encrypting the data it generates before it travels over the network. Data encryption involves translating plain text data into an encoded form using an encryption algorithm and an encryption key. The output of the encryption turns the plaintext data into cipher text, which can only be decoded by a decryption key. This method is commonly used to provide end to end protection, authentication and ensure data integrity for data being transferred over networks.

IoT devices are complex and the data which they transmit is diverse. Some sensor data may be more important than others. For example, air quality data may be made widely available, but data coming from a heart monitor is more sensitive and may require encryption.

It is known to use cryptographic credentials to uniquely identify each device and this can be used to authenticate a device as the source of a particular data item. To solve tampering of devices via firmware updates they use their own code-signing solutions to ensure code is not tampered with while in transit to the device for an update. However, they do not take into consideration the specification of the device to determine the most appropriate algorithm to use. It is also known to provide data encryption at an application level rather than to the whole device. They make use of dynamic keys (keys which are only used once) to ensure key security and reduce the overhead of key management. Based on a predetermined policy, encryption can be applied to specific data streams or applications on IoT devices/gateways.

However, these systems do not choose which IoT data to encrypt, or at what level, on a given device—it is usually a simple choice between encrypting everything (at a given level), or encrypting nothing.

Policy-driven encryption solutions provide IoT data encryption at an application level rather than to the whole device. They make use of dynamic keys (keys which are only used once) to ensure key security and reduce the overhead of key management. Based on a policy, encryption can be applied to specific data streams or applications on IoT devices/gateways.

Public and private keys are important to data encryption. The keys are generally unique long numbers that are mathematically related to each other. A public key may only be decrypted by a private key.

Public keys—a key which is available to anybody

Private keys—a key which is only available to its owner

For data encryption to be successful, effective key lifecycle management is essential. Poor key management will decrease overall security but can add extra overhead on the devices.

Common encryption methods include:

Symmetric Encryption

A single private key is used for encryption & decryption

E.g. User-A encrypts data using a private key→User-A sends data to User-B→User-B uses same private key to decrypt data Example algorithm: Advanced Encryption Standard (AES)

AES uses three fixed block ciphers (AES-128, AES-192, AES-256) and cryptographic keys of 128, 192 and 256 bits. Each cipher encrypts/decrypts data in blocks of 128 bits using cryptographic keys.

This algorithm is lightweight and can be implemented in hardware and software.

Asymmetric Encryption

Different keys are used for encryption & decryption

E.g. User-A encrypts data with a User-B's public key→User-A sends data to User-B→User-B decrypts data with his own private key that corresponds to the public key User-A encrypted with.

Examples algorithm: RSA

RSA encryption is the most common asymmetric algorithm. It is based on factorising prime numbers as reversing that process is difficult for a computer. It is a slow algorithm because factorising prime numbers becomes more demanding for a computer has the prime numbers increase.

Asymmetric encryption may also be used in reverse to prove the provenance of data. Anyone with access to the public key can decrypt data if it has been encrypted by the corresponding private key, thus proving that the data was generated by the holder of that key.

RSA and AES encryption are just some example of algorithms that can be used. Other examples include Blowfish, Twofish and DES.

Another form of security is "hashing". This is not an encryption system, but a method of generating a fixed-length value (a hash) for data which cannot be reversed. It is typically used to provide digital signatures used to verify the integrity of data.

Many common encryption algorithms are effective but heavyweight so cannot be supported in IoT devices due to their limited resources such as computing, storage and battery power, making it difficult to apply general data encryption methods. Less well known lighter weight encryption have been developed specifically for IoT devices. Requiring fewer resources to perform them e.g. key size is smaller, use less memory and execution time is quicker.

In addition, data encryption can be difficult to set up and understand, and consequently data is often made available without adequate security or, if it is recognised as too sensitive to be made available without security, it may not be made available at all.

The present invention addresses these issues by providing a dynamic approach to encrypting IoT data.

According to the invention, there is provided a method of controlling a communications device to operate according to a prescribed policy, wherein an encryption server remote from the device selects a respective encryption policy for each of one or more applications running on the device and generates an encryption agent for transmission to the device for deployment, the agent being configured to control the device to encrypt data according to the encryption policies selected by the encryption server according to the application that is to process the data. This allows encryption types and key lengths to be set for individual applications based on the type of IoT device and applications being run.

Embodiments of the invention analyse the device to ensure the most suitable encryption algorithm is used for IoT devices.

Embodiments of the invention provide adjustment due to resource usage (CPU, bandwidth, battery etc), data sensitivity, external events and notifications of vulnerabilities to device type and applications used, in order to allocate resources more efficiently.

Moreover, it may not be required to encrypt data all the time. If a device is securely configured it may not be necessary to labour the device with constant data encryption. However, it may be required to respond to network and security events by starting to encrypt IoT data, or changing its level of encryption. Such an active response is currently not possible without human intervention.

Embodiments of the invention provide dynamic adjustment based on analysis of one or more dynamic factors such as resource usage (CPU, bandwidth, battery etc), data sensitivity, external events and notifications of vulnerabilities to device type and applications used, in order to allocate resources more efficiently.

Embodiments of the invention analyse device network and security events on IoT devices to determine if encryption is necessary and apply encryption as when it is required.

The invention may be embodied in software comprising computer program code for controlling a general-purpose computer to perform the steps of the process.

The invention also extends to a computer system including a processor and a memory storing computer program code for performing the steps of the process of the invention, and to a computer program element comprising computer program code to, when loaded into a computer system and executed thereon, cause the computer to perform the steps of the process.

Embodiments of the invention provide a Dynamic Encryption Policy, defining encryption type & encryption key length, based on IoT Device & App Analysis: this will help determine what the most appropriate type of encryption for the IoT device and/or IoT app. Thus the encryption type (AES256, or RSA, DES, AES128, etc) and encryption key length will vary depends on the type of IoT Devices (for example if the IoT is Smart and has powerful resources it will use different types of encryption and Key length than IoT devices having more limited resources).

The Applied Encryption Policy can be dynamically changed based on IoT resource usage: based on the IoT resources consumption and data sensitivity the encryption policy can be changed to free more resources for IoT. With this mechanism it is possible to adapt the IoT resource consumption to reconfigure the encryption policy based on dynamic changes of the IoT resources.

An embodiment of the invention provides a dynamic response to IoT security and network events, by deploying an agent that automatically monitors the IoT and network towards any security events (malware detected, attack, threats, etc) and changes the encryption policy based on the level of attack that has been detected. If an event is highly critical the agent is informed/triggered agent to apply stronger encryption.

The system is able to apply encryption to the device as a whole or specifically to an IoT application running on a device. If applying encryption specifically to an IoT application, during the Dynamic IoT Device and App Analysis the system will check whether the device already has encryption applied. This will be taken into account by the Encryption Policy Generator to ensure duplicate encryption is not applied and labour the device.

An agent is sent to the device alongside the encryption policy to enforce it. For example, the Encryption Policy Generator may determine that the IoT device/app does not require 24/7 encryption, but should a malicious event occur then encrypt. The system triggers the agent to enforce the policy accordingly.

Systems that apply appropriate encryption to IoT devices already exist. However, typically most common encryption algorithms are applied to the device as a whole and require human setup. In addition, existing techniques mean that encryption is either "on or off". If encryption is on all the time, it may not be required and may cause the device unnecessarily labouring and resource usage i.e. CPU and battery.

Embodiments of the invention allow encryption to be applied per IoT application or data stream, as well as to the whole IoT device. It also allows the best encryption method for the IoT device/application to be determined by analysing the device/app properties. Encryption can be automatically and actively applied as and when required (e.g. an attack on the device)

BRIEF DESCRIPTION OF THE DRAWINGS

An embodiment of the invention will be described by way of example, with reference to the drawings, in which:

FIG. 4 is a flow diagram depicting a process operating according to the invention to dynamically adjust encryption on an IoT device according to a predetermined policy.

FIG. 5 is a flow diagram depicting a process operating according to the invention to adapt a preferred policy to limited resources.

DETAILED DESCRIPTION OF PRESENT EXAMPLE EMBODIMENTS

Figure 1A:
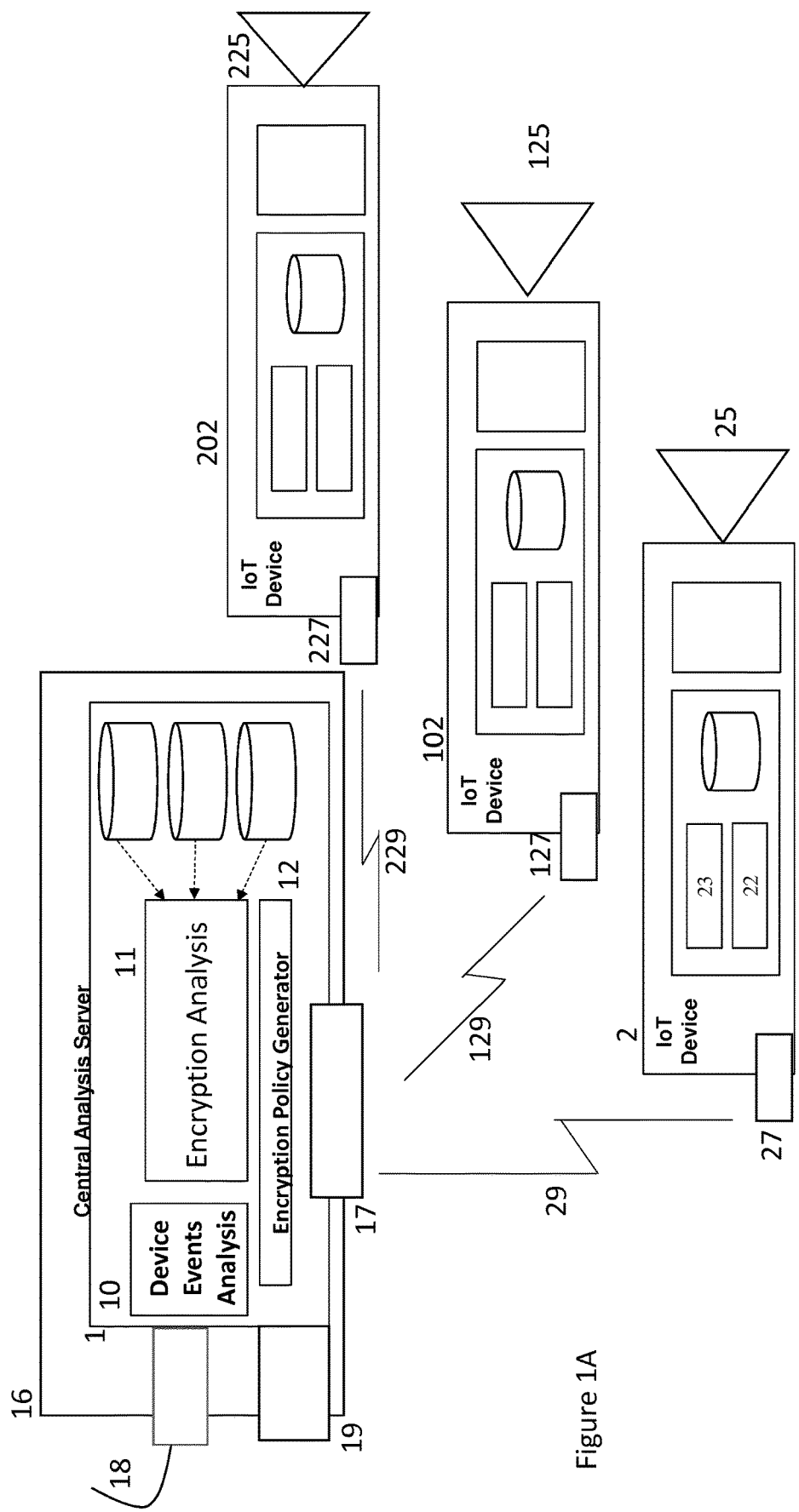
FIG. 1A is a schematic diagram depicting network elements which co-operate to perform the embodiment of this invention.

Referring firstly to FIG. 1A, this depicts a gateway device 16 and a number of remote terminals 2, 102, 202 which are in communication with the gateway through respective network interface elements 27, 127, 227, and communications links 29, 129, 229 to a gateway communications interface 17 at the gateway. The communications links can use any suitable medium and protocol, for example a fixed or wireless local area network (LAN, WLAN). The gateway device 16 also has a connection 18 to a general telecommunications network, for example an ADSL connection to the Internet.

The remote terminals 2, 102, 202 have respective sensors and/or actuators 25, 125, 225 which co-operate with each other through the communications network 29, 129, 229. The operation of these devices, including such factors as how an actuator is to respond to a given input, what data to record, when to transmit it, and in what format (including what level of encryption, if any, to provide) is managed in each device 2, 102, 202 by a respective policy decision point 22 and policy enforcement point 23 (as depicted in terminal 2).

The gateway device 16 includes a central analysis server 1 which controls the operation of the policy decision points 22 and policy enforcement points 23 in the remote terminals 2, 102, 202, as will now be described with reference to FIG. 1, which depicts the central analysis server 1 in more detail, and FIG. 2, which depicts one of the remote terminals 2 in more detail.

Figure 1:
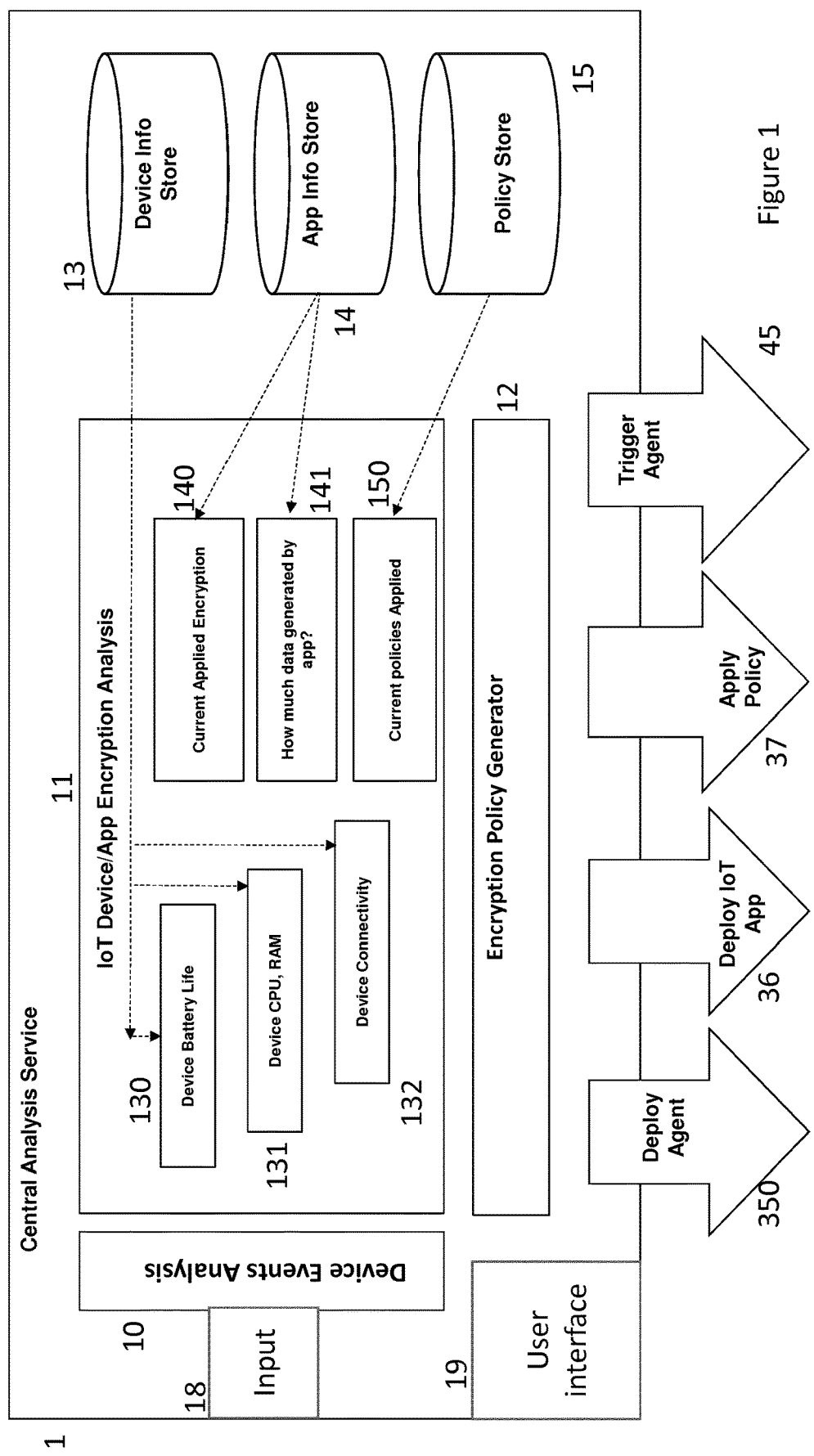
FIG. 1 is a schematic depicting the functional elements of a central analysis server operating according to the invention.

Referring now to FIG. 1, the management function of the system is performed by a Central Analysis Service (CAS) function 1, hosted on a server operating as a gateway providing an interface between a number of IoT devices. The CAS function includes an analysis element 11 responsible for analysing the IoT devices and applications, using data maintained in respective stores 13, 14, 15 to determine the best encryption method. The analysis system 11 includes a number of elements, handling analysis of battery life (130), data handling capacity (131), network connections (132), encryption already in operation (140), the data capacity requirements of the application (141) and existing policies applied to the IoT device (150). It includes a policy generator 12 for generating instructions detailing the necessary steps to apply the chosen encryption to each device, as well as when to apply it. The CAS sends the policy 37 as well as an agent 35 to each device to enforce the policy. Details of policies previously applied to the device are maintained in a store 15. A user interface 19 is also provided.

The CAS function also comprises an event analysis function 10 for responding to events in the network, or identified in messages from external sources, which may be indicative of a security threat, and determines a criticality level for such events in order to determine an appropriate course of action, such as to change the strength of encryption, or the types of data to be encrypted. This then triggers agents previously deployed on each device to cause it to operate according to the new encryption policy for the agent to enforce.

Figure 3:
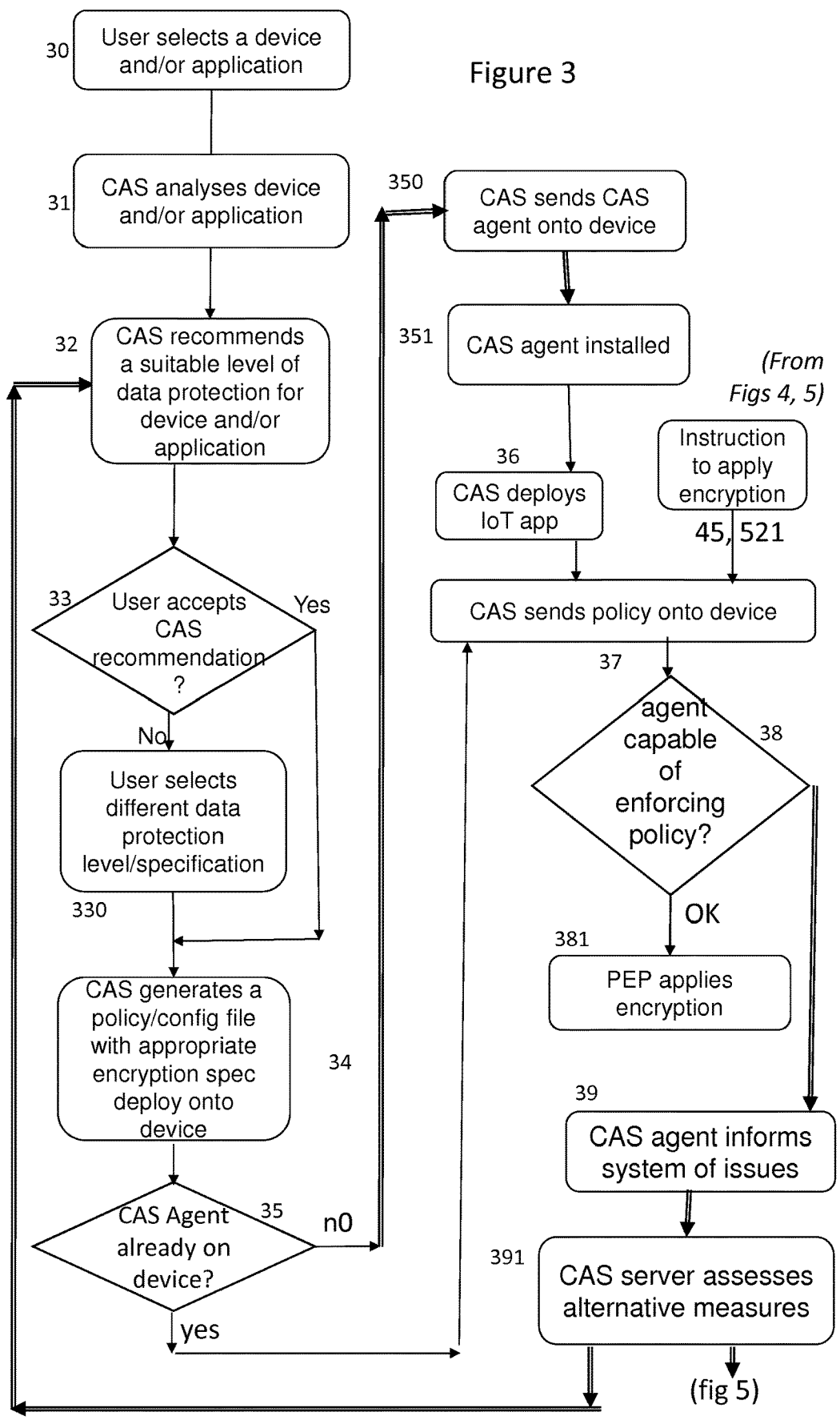
FIG. 3 is a flow diagram depicting a process operating according to the invention to establish an encryption policy on an IoT device.

High Level System Flows according to an embodiment of the invention are depicted in FIGS. 3 and 4. FIG. 3 depicts the initial application of an encryption policy to an IoT device or application.

Each device 2 to be managed is in communication with a gateway device which either hosts the central analysis service function 1 (CAS) itself, or provides access to a server on which the CAS 1 is hosted.

Initially the user selects one or more applications 21 to be run on a device 2 (step 30), and communicates this request through the user interface 19. The user interface may be a connection to the device 2 on which the application is to be run, but in general will be a connection to a general-purpose user device such as a laptop computer through which the user can control the operation of several interacting devices 2 remotely.

The CAS function 1 performs dynamic specification analysis of each IoT device 2 with which it is associated, and of any IoT applications 21 to be run on the device (step 31), and generates an agent application, referred to herein as the CAS agent 20 (step 32).

Prior to deployment onto the device, the generated policy may be communicated to the user through the user interface 19 to allow the user the option to reject or edit the recommended encryption approach (step 33, 330). For example, based on the analysis, the CAS server may determine that the data is not sensitive enough to require constant data encryption, but the user may then choose to encrypt it anyway. Another alternative can be to only encrypt selected data, for example heartbeat data or only log data, rather than all the data from an application.

Results from the analysis are stored in the device database 13 where it can be used at a later stage to determine the most recent state of the device.

The analysis stage 11 will be aware of the current status of the device 2 as recorded in the data store 13. For example, data from an IoT application running on the device may have previously been configured to be encrypted, so the device it is running on will already have an active CAS agent 20. The CAS server 11 can therefore determine whether an agent 20 is already active on the IoT device 2 (step 35). If no agent is currently present, an agent is generated and transmitted to the device 2 (step 350) and installed on it (step 351). The agent controls configuration of the device to execute the policy by setting up encryption algorithms, and specifying when any criteria apply for which encryption is required, enforcing and applying encryption, and reporting to the CAS server of any issues, for example that it cannot perform a new encryption policy provided as a result of a critical event.

The analysis component 11 analyses data 13, 14 relating to the IoT device and application to determine what resources are available on the device, and how much data would be generated by the application, to determine the best encryption approach to take to secure the device and/or application. To do this the CAS function determines how many resources are available on the device and/or how much data is generated by the IoT application to be encrypted. IoT devices are first analysed to determine what resources are available. The resources and other specifications that may be checked can include CPU capacity, memory, storage, network connectivity, any current encryption policies enforced (information which can be retrieved from the Policy Store (15), and the physical location of the device.

Data relating to IoT applications that may be encrypted can be checked for the volume, sensitivity and destination of the data to be generated. Such IoT application information is fetched from an application specification data store 14.

The output of the IoT Device & App Encryption Analysis 11 is used as input for the Encryption Policy generator 12 to determine the best approach to apply encryption. The Encryption Policy Generator 12 function then generates a policy that determines the best approach of data encryption (step 34). For example, it can specify an appropriate encryption algorithm and instructions on how to configure it, which data should be encrypted, and in what circumstances (for example only encrypting if malware is detected).

For example, the device may have enough resources to perform data encryption but, if the IoT data is not of high importance or sensitivity, encryption may not be necessary unless a malicious event occurs. The policy can detail this information.

The CAS application also holds details on a number of different encryption algorithms, and select the most appropriate one based on the various attributes returned from the analysis stage.

The selected application can then be downloaded to the IoT device 2 (step 36), followed by the policy requirements (step 37)

Figure 2:
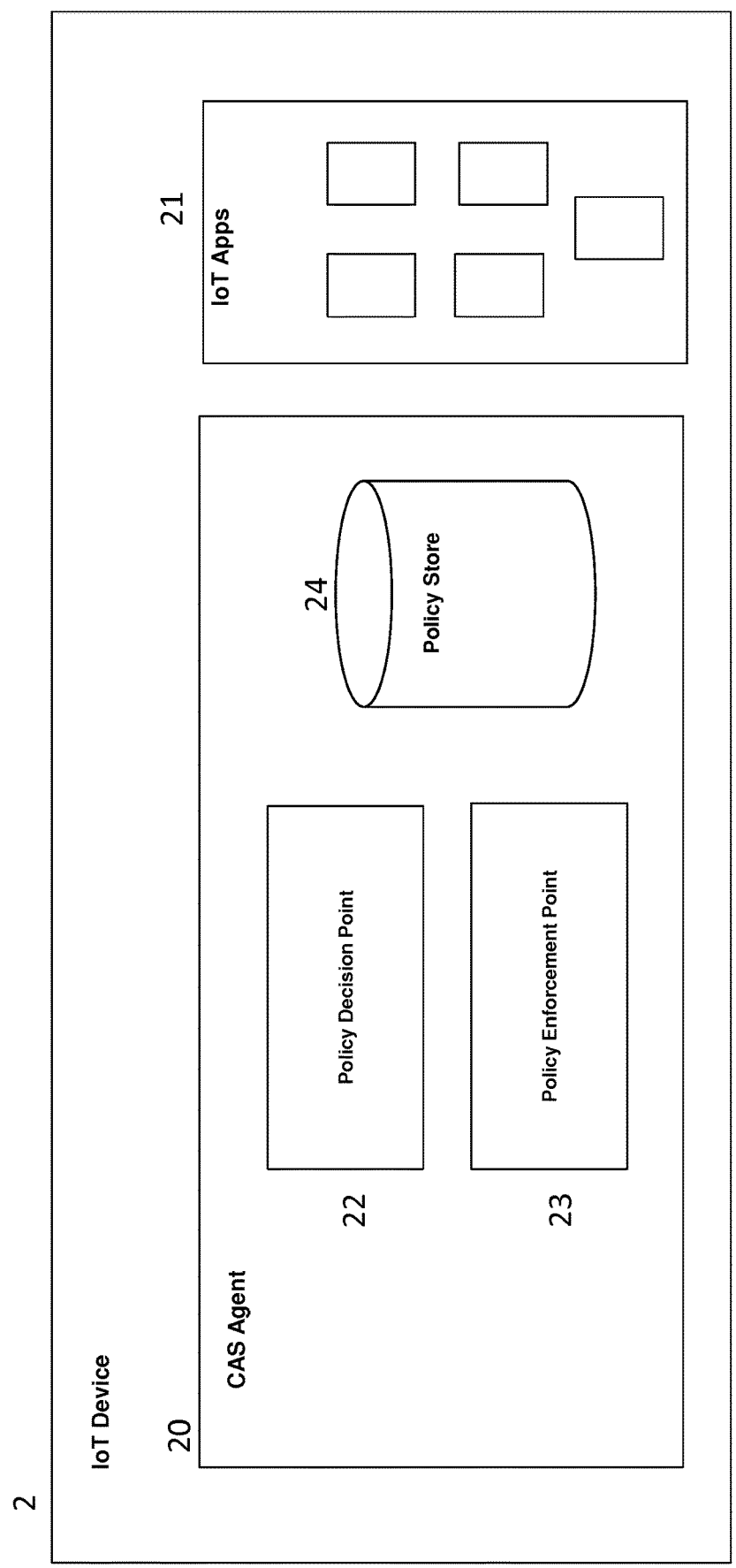
FIG. 2 is a schematic depicting an IoT Device incorporating a CAS Agent component.

FIG. 2 is a schematic diagram showing the functional elements of a CAS Agent 20 deployed on an IoT device 2. The CAS agent comprises a Policy Enforcement Point (PEP) 23 which receives policies and triggers from the CAS and carries out encryption required by the policy on the device 2 and any applicable application data 21. Data relating to the policies, when received from the CAS server, are stored locally in a store 24.

Referring again to FIG. 3, upon receiving the new policy (step 37), a Policy Decision Point Component (PDP) 22 of the CAS agent 20 checks all the necessary measures are taken in order to apply encryption according to policies 24 previously provided by the CAS server 1. This is typically done on request by the PEP 23. For example, when a new policy is received, the PEP 23 instructs the PDP 22 to check whether encryption is to be applied immediately or whether if it is to be applied conditionally, for example in the event of a critical event, and then checks whether appropriate public/private keys have been set up, and applies such keys if required.

CAS agent 20 on the IoT device 2 first checks if the device has enough resources (e.g. compute power, battery, connectivity) to run the encryption policy (step 38). This is done because the CAS server may have an outdated view of the system, and is done to ensure that the current state of the device (e.g. how much computing power) is compatible with the policy. Should the device not be able to perform the new security measures it returns a message to the server (39), which then determines what course of action is to be taken. If the event is highly critical, it may decide to stop all incoming/outgoing connections on the IoT device. Alternatively, it may stop or pause other applications to free resources up for encryption (step 391).

Provided the checks do not reveal such a problem, the Policy enforcement point 23 then proceeds with the change in level of encryption (step 381)

FIG. 4 depicts the dynamic adjustment of encryption according to external influences.

The device events analyser 10 in the CAS server triggers changes in policy in response to external events reported to the CAS server 1 through inputs 18 (step 41). The Device Events Analyser 10 receives network and security events from external monitoring systems, and analyses their criticality specifically to the IoT device and attributes of the applications. For example, it may rate a security event more critical on a device located in a hospital handling medical information, than a device that is outputting air quality data.

Typical network and security events can include breaches of firewall rules, detection of malware, intrusions, suspicious incoming traffic, or unexpected applications, or physical movement of, or intrusion into, the IoT device.

The CAS server has to ensure the proposed policy will be is appropriate for the device 2. If there has been a recent analysis of the device, (step 420), or the event is not critical (step 42) the CAS server may call on the IoT Device/App encryption analyser 11 to perform a new analysis (step 43). In other cases, where there is no recent analysis (420) or the event is urgent/critical (step 42) the Encryption Policy Generator 12 can create or amend policies on the basis of the most recent analysis (step 44).

Encryption may not be constantly necessary, but only required in the event of a malicious attack on the device. In such case, the event analyser 10 can check the criticality of the event (e.g. is it malware & how severe is it) and, based on the criticality, can change the encryption policy to be more secure, for example by applying a different encryption method. If an event is particularly critical (42) it uses details of the latest device analysis to create a new policy (step 44) to send to the IoT device (step 45). If the event is less critical, the server re-analyses the device to determine the average resource use and determine an appropriate approach to secure data (step 43). If a new policy is generated as a result of the analysis steps 43, 44, it is sent to the device 2 (step 45).

Referring again to FIG. 3, in response to receipt by the device 2 of the new policy generated as a result of a critical event (step 45), the PEP 23 on the agent 20 requests that the PDP 22 checks whether the policy can be applied (step 38, FIG. 3), for example by determining whether the device has the resource capability to perform a new encryption method.

When encryption is to be applied the PEP calls on the PDP to ensure all the necessary measures required for the encryption are set up (step 381).

If the PEP 22 receives a response 39 from the PDP 12 indicating that the IoT device 2 is unable to meet the policy selected by the policy generator 12, it can determine alternative action (step 391, and then generates a suitably revised policy in accordance within this assessment (steps 32-34 repeated). Examples of possible alternative actions are depicted in FIG. 5.

The action taken in the case of a security/network event depends on the severity of the event and the capabilities of the IoT device, which will determine how best to use computing resources whilst still maintaining appropriate levels of encryption of critical data. For example, an application may, in normal use, transmit encrypted raw data to a central reporting location, which analyses the data to generate a log. If the required encryption level has to be raised to meet a detected threat, it may become more efficient to use some of the processing power in the device to generate the log, so that only the log data has to be encrypted (at the higher level) by the device.

The decision (step 50) may be, for example, to transmit the full data (step 520) using a lower encryption level suitable for the device, in which case the agent is instructed accordingly (step 521). Alternatively, if the required encryption level limits the amount of data which may be sent (step 510) some encrypted data may be diverted to remote "Cloud" storage, with only a log recorded of the address of the encrypted data on the device 2 itself (step 511) so that the data can be retrieved when required. In other cases, if inadequate resources are available to provide a suitable encryption level for the data to be collected (step 500), the policy may require that the server suspend the data collection process (step 501). If appropriate, the server may then seek other methods of obtaining any data it requires (step 502), such as identifying other sensors that could provide relevant information.

An example would be a system used to monitor road traffic congestion, using a CCTV camera to monitor the number or speed of vehicles using a stretch of highway. If the video data is to be processed remotely, it may require encryption before transmission to the location where such analysis is to be made, in order to protect the privacy of road users (step 520, 521). At times of raised security alerts, a raised encryption level may be required, which would require greater processing power at the IoT device associated with the camera. It may then become more efficient for the IoT gateway or edge device linked to the camera to process the video data itself and only send to the "cloud" the number of vehicles seen on CCTV (step 510, 511). This processing requires extra resources at the IoT device, but reduces the amount of data that requires transmission, and thus the amount of processing power needed to encrypt it. If the processing results in anonymising the data (for example only reporting the number of vehicles passing a point rather than identifying them), it may also only need a lower level of encryption than would be required for the raw data (or no encryption at all). An alternative strategy may be to reduce the number of sensors that are to report data (step 500, 501)

The invention claimed is:

1. A method of controlling a communications device to operate according to a prescribed policy, wherein an encryption server remote from the device selects an encryption policy for one or more applications running on the device and generates an encryption agent for transmission to the device for deployment, the agent being configured to control the device to encrypt data according to the encryption policy selected by the encryption server, in which method, in response to a network or security event, the encryption server analyses the network and security event to determine an encryption level and analyses the device to determine the resource usage of the device, adjusts the encryption policy in accordance with the determined encryption level and the determined resource usage of the device to allocate resources of the device more efficiently, and communicates the adjusted encryption policy to the device.

2. The method according to claim 1, wherein the network or security event is a security threat detected by or communicated to the network, and the device is controlled to apply the adjusted encryption policy in response to the detected security threat.

3. The method according to claim 2, in which the security threat is is reported to, or detected by, the encryption server, and the encryption server transmits a trigger signal to the device to activate a change in encryption in the device in accordance with a previously deployed encryption policy by applying the adjusted encryption policy.

4. The method according to claim 1, in which the encryption server sets encryption types and key lengths to individual applications based on the type of Internet of Things (IoT) device and applications being run.

5. The method according to claim 1, in which encryption types and key lengths are dynamically adjusted by the encryption server in response to notifications of vulnerabilities to device type and applications used, and the encryption server transmits instructions to the device to make consequential changes in the policy to be run on the device.

6. The method according to claim 1, further comprising controlling the device to apply the adjusted encryption policy.

7. The method according to claim 5 in which the encryption server is instructed to cease processing of data if the resources usage of the device is insufficient to allow an encryption feature to be applied to the device.

8. The method according to claim 5, wherein the encryption server is instructed to cease local storage of data if the resources usage of the device is insufficient to allow an encryption feature to be applied to the device.

9. The method according to claim 1, wherein the encryption server is embodied in a gateway device providing a communications interface between the communications device and a communications network.

10. The method according to claim 9, wherein the gateway device provides communications interfaces between a plurality of communications devices and the communications network, and provides and co-ordinates encryption server functions for the plurality of communications devices.

11. A computer system comprising:
a processor; and
a memory storing computer program code, which upon execution by the processor configures the computer system to:

control a communications device to operate according to a prescribed policy, wherein an encryption server remote from the device selects an encryption policy for one or more applications running on the device and generates an encryption agent for transmission to the device for deployment, the agent being configured to control the device to encrypt data according to the encryption policy selected by the encryption server, and in response to a network or security event, the encryption server analyses the network or security event to determine an encryption level and analyses the device determine the resource usage of the device, adjusts the encryption policy in accordance with the determined encryption level and the determined resource usage of the device to allocate resources of the device more efficiently, and communicates the adjusted encryption policy to the device.

12. A non-transitory computer readable storage medium storing computer program code to, when loaded into a computer system and executed thereon, cause the computer system to perform steps of a process of controlling a communications device to operate according to a prescribed policy, wherein an encryption server remote from the device selects an encryption policy for one or more applications running on the device and generates an encryption agent for transmission to the device for deployment, the agent being configured to control the device to encrypt data according to the encryption policy selected by the encryption server, and in response to a network or security event, the encryption server analyses the network or security event to determine an encryption level and analyses the device to determine the resource usage of the device, adjusts the encryption policy in accordance with the determined encryption level and the determined resource usage of the device to allocate resources of the device more efficiently, and communicates the adjusted encryption policy to the device.

13. The method according to claim 1 wherein the network or security event includes a breach of a firewall, a detection of malware, or a physical movement of the device.

14. The method according to claim 1 wherein the determined resource usage of the device includes usage of a CPU, bandwidth or battery of the device.

15. The method according to claim 1 wherein the adjustment of the encryption policy results in a reduction in an amount of encrypted data being transmitted from the device.

16. The method according to claim 1 wherein the adjustment of the encryption policy results in a reduction in an amount of processing power of the device needed to encrypt data.

17. The computer system according to claim 11 wherein the network or security event includes a breach of a firewall, a detection of malware, or a physical movement of the device.

18. The computer system according to claim 11 wherein the determined resource usage of the device includes usage of a CPU, bandwidth or battery of the device.

19. The computer system according to claim 11 wherein the adjustment of the encryption policy results in a reduction in an amount of encrypted data being transmitted from the device.

20. The computer system according to claim 11 wherein the adjustment of the encryption policy results in a reduction in an amount of processing power of the device needed to encrypt data.

* * * * *